US007261242B2

(12) United States Patent
Houde

(10) Patent No.: US 7,261,242 B2
(45) Date of Patent: Aug. 28, 2007

(54) SOUND INSULATION FOR ELECTRIC RELAY

(75) Inventor: François Houde, Mt. St. Gregoire (CA)

(73) Assignee: Honeywell International Inc., Morristown, NJ (US)

(*) Notice: Subject to any disclaimer, the term of this patent is extended or adjusted under 35 U.S.C. 154(b) by 390 days.

(21) Appl. No.: 10/768,095

(22) Filed: Feb. 2, 2004

(65) Prior Publication Data

US 2005/0167515 A1 Aug. 4, 2005

(51) Int. Cl.
*G05D 23/00* (2006.01)
*F25D 19/00* (2006.01)

(52) U.S. Cl. .......................... 236/1 C; 236/94; 62/296

(58) Field of Classification Search ................ 236/1 C, 236/194, 94; 62/296; 206/706
See application file for complete search history.

(56) References Cited

U.S. PATENT DOCUMENTS 3,059,076 A * 10/1962 Horman ...................... 335/119
3,416,060 A * 12/1968 Evalds ....................... 318/473
3,421,131 A * 1/1969 Levinn et al. ............. 337/338
3,581,062 A * 5/1971 Aston ......................... 219/501
3,944,774 A * 3/1976 Noba et al. ............. 200/302.1
4,296,331 A 10/1981 Rodriguez
4,594,644 A 6/1986 Painter
5,008,213 A 4/1991 Kolesar, Jr.
5,592,989 A * 1/1997 Lynn et al. ................. 165/259
5,936,510 A * 8/1999 Wehl et al. ................. 337/377
6,020,807 A * 2/2000 Givler ........................ 337/377
6,072,234 A 6/2000 Camien et al.
6,347,747 B1 * 2/2002 Nesbitt ..................... 236/78 D
6,435,418 B1 * 8/2002 Toth et al. .................... 236/94
2002/0066881 A1 6/2002 Koppe
2002/0097119 A1 7/2002 Molyneux et al.
2002/0109109 A1 8/2002 Kondoh et al.
2003/0173655 A1 9/2003 Rissing et al.

* cited by examiner

*Primary Examiner*—Marc Norman

(57) ABSTRACT

An electric unit, such as a room thermostat has a circuit board and an electromechanical switch mounted to the circuit board. The circuit board and the electromechanical switch are housed in a casing. The casing is filled with a sound insulation material with the electromechanical switch embedded in the sound insulation material in order to dampen the click sound produced by the communication of the electromechanical switch.

16 Claims, 4 Drawing Sheets

SOUND INSULATION FOR ELECTRIC RELAY

BACKGROUND OF THE INVENTION

1. Field of the Invention

The present invention relates to electromechanical switches and, more particularly, to acoustically isolated relays.

2. Description of the Prior Art

Electric and electromagnetic relays are electromechanical switches operated by a flow of electricity in a circuit and controlling the flow of electricity in another circuit, such as a room heating circuit. Such relays basically comprise an electromagnet with a soft iron bar (namely the armature) held close to it. A movable contact is connected to the armature in such a way that the contact is held in its normal position by a spring. When the electromagnet is energized, it exerts a force on the armature that overcomes the pull of the spring and moves the contact from a normally open position to a closed position or vice versa. The change of state of the contact produces a "click" sound, which in certain applications, such as when the relay is used in a room thermostat, might be undesirable.

According to applicant's knowledge, no one has heretofore addressed the problem of acoustically insulating an electric relay.

SUMMARY OF THE INVENTION

It is therefore an aim of the present invention to provide a solution to at least dampen the click sound produced by an electric relay when it switches from an open state to a closed state and vice versa.

It is also an aim of the present invention to provide a method of acoustically insulating a relay.

Therefore, in accordance with a general aspect of the present invention, there is provided a room thermostat comprising a circuit board, at least one electric relay mounted to the circuit board, a primary casing defining a chamber for housing the circuit board with said at least one electric relay mounted thereon, wherein said chamber is filled with a sound insulating material to dampen the noise generated by said at least one electric relay.

In accordance with a further general aspect of the present invention, there is provided a method for acoustically damping the click sound produced by an electromechanical switch comprising an electromagnet and an armature, the method comprising the steps of: disposing the electromagnet and the armature in a casing, and filling the casing with a sound insulating potting compound.

In accordance with a still further general aspect of the present invention, there is provided an acoustically insulated electric unit comprising at least one electromechanical switch, a casing housing said electromechanical switch, said casing being filled with a sound insulation material such that said electromechanical switch be substantially completely embedded in said sound insulation material.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
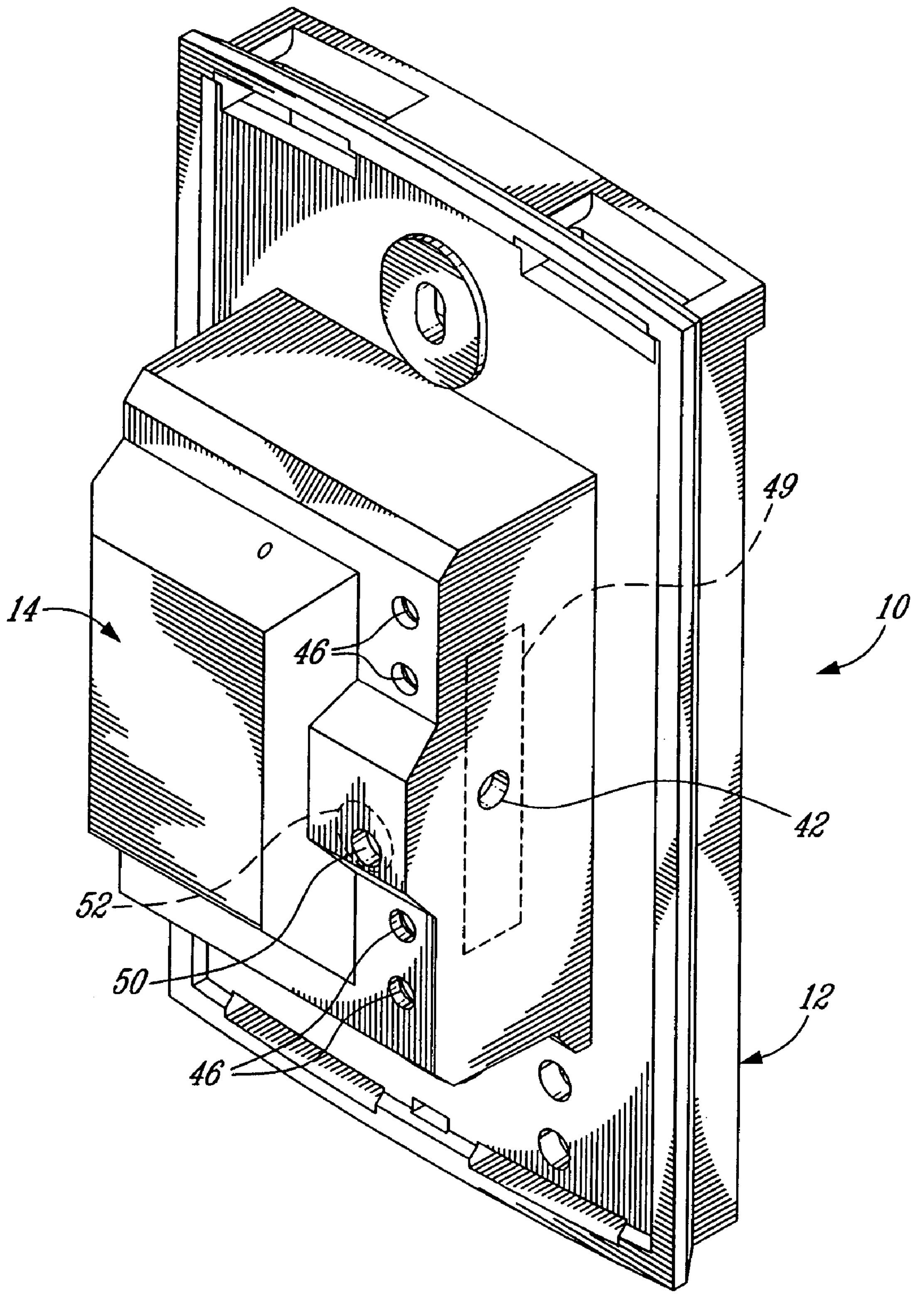
FIG. 1 is a perspective view of a room thermostat power unit comprising a casing housing two electric relays and a transformer mounted on a circuit board, the casing being filled with epoxy in accordance with a preferred embodiment of the present invention.

FIG. 1 shows one possible application of the present invention for acoustically damping the "click" sound produced by an electromechanical switch, such as a relay, used in an electric heating system.

More specifically, FIG. 1 shows a thermostat power unit 10 comprising a casing 12 including a base member 14 and a cover 16 (FIG. 2). The base member 14 and the cover 16 are preferably made of a plastic material and are adapted to be sealingly assembled together. The cover 16 is provided on an inner surface thereof with a peripheral ridge 17 for mating engagement with a corresponding groove 19 defined in the upper or front face of the base member 14 about the cavity thereof.

Figure 2A:
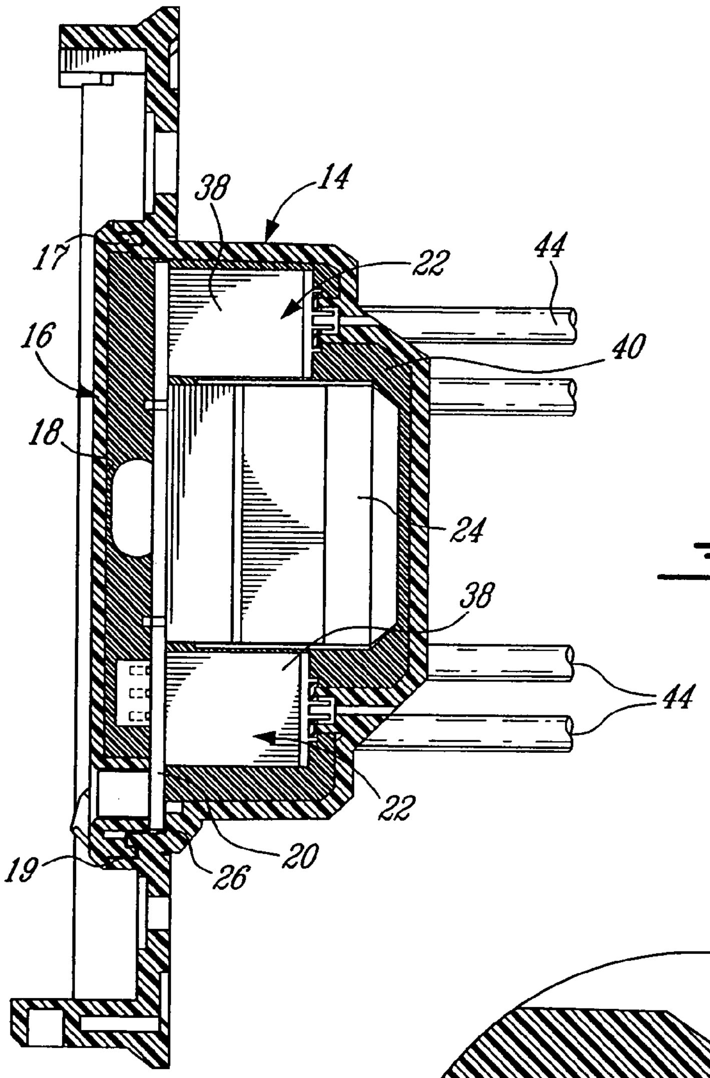
FIG. 2*a* is a cross-sectional side view of the thermostat power unit shown in FIG. 1.

As shown in FIG. 2*a*, the base member 14 and the cover 16 cooperates to form a closed chamber 18 housing a circuit board 20 on which is mounted a pair of relays 22, a transformer 24 as well as other electric circuit components. The circuit board 20 is received in the base member 14 and supported therein by a shoulder 26 and/or inwardly projecting pegs (not shown) provided on an inner surface of the base member 14. The transformer 24 and the relays 22 are provided on the side of the circuit board 20 which faces the bottom or rear surface of the base member 14.

Figure 5:
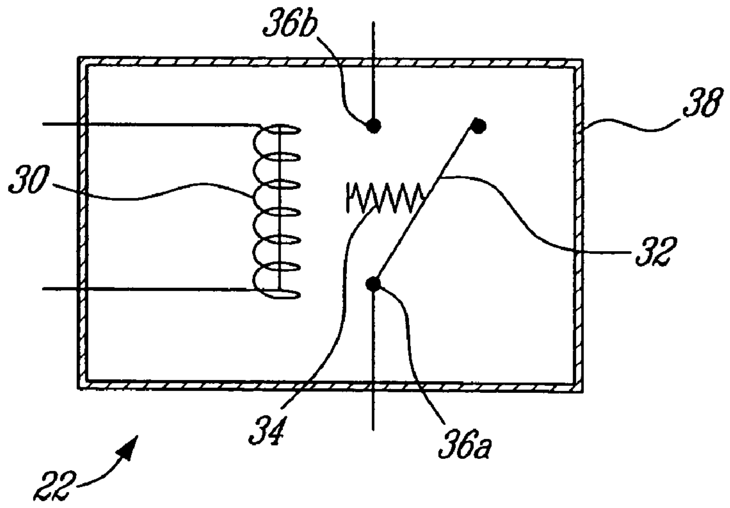
FIG. 5 is a schematic diagram of the components inside the relays shown in FIG. 1.

As diagrammatically shown in FIG. 5, each relay 22 generally comprises an electromagnet 30, an armature 32, a spring 34 and a set of contacts 36 housed within a casing 38. When the electromagnet 30 is energized, it exerts a force on the armature 32 that overcomes the biasing force of the spring 34, thereby moving the movable contact 36a to a closed position to permit current flow through the circuit. Each time the movable contact 36a moves from a closed position to an open position or vice versa, a clearly audible click sound is produced.

It is herein proposed to dampen that sound by completely filling the chamber 18 with a sound insulating potting compound 40 such that the relays 22 be surrounded on all sides by the sound insulating potting compound 40. According to a preferred embodiment of the present invention, the relays 22 are embedded in an epoxy potting compound. It is understood that other sound insulating materials could be used as well. For instance, a urethane potting compound could be used.

Figure 3:
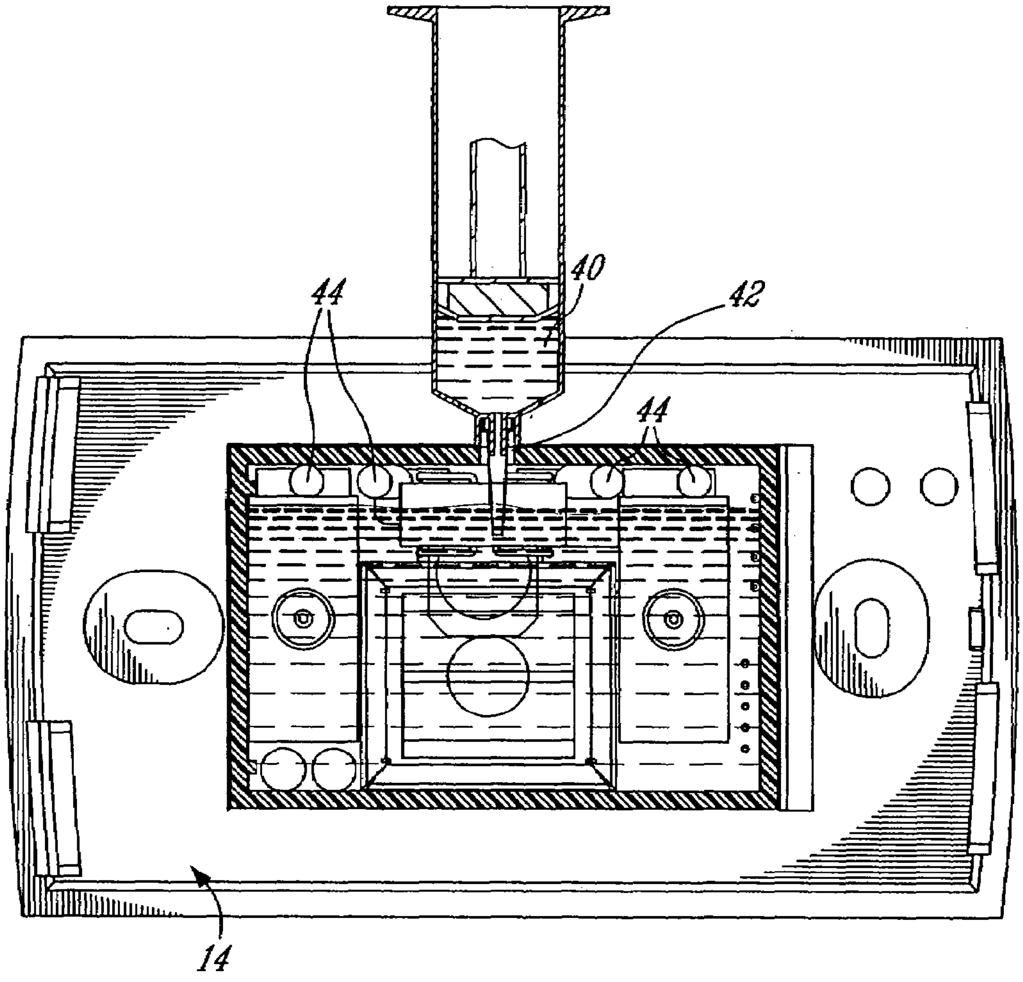
FIGS. 3 and 4 illustrate a two-fold procedure for injecting the epoxy into the casing in accordance with a general characteristic of the present invention.

As shown in FIG. 3, the epoxy is first poured into the chamber 18 through an opening 42 defined in one side of the base member 14. The chamber 18 is filled up to the level of a number of electric cables 44 extending from the circuit board 20 and projecting outwardly of the casing 12 via corresponding cable openings 46 (FIG. 1) defined in the rear surface of the base member 14. A bar code sticker 49 (FIG. 1) can be applied over the side opening 42 after the epoxy potting is completed.

Figure 4:
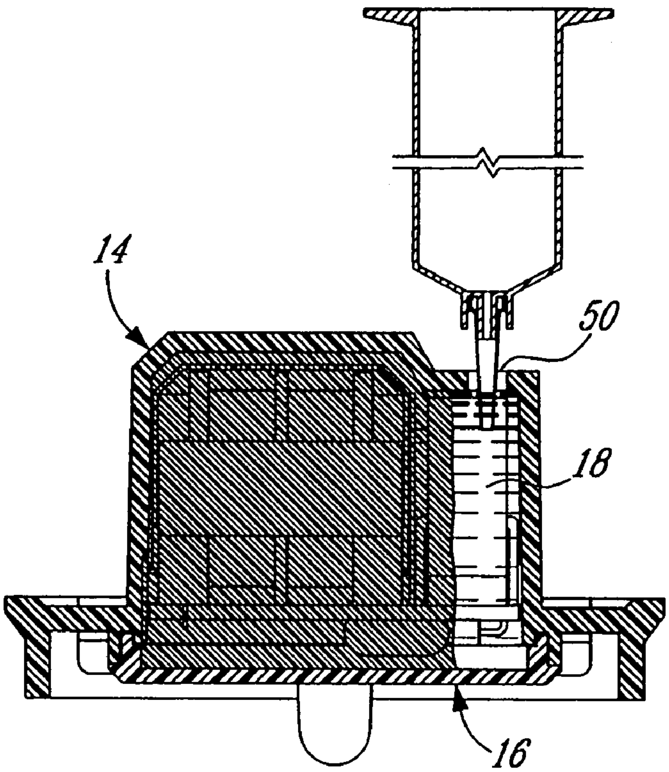

After the epoxy potting has cured, the casing 12 is then placed face down on a horizontal surface, and the rest of the chamber 18 is filled with epoxy through a second opening 50 defined in the bottom surface of the base member 14, as shown in FIG. 4. A sticker 52 (FIG. 1) is then preferably applied over the second opening 50.

By so filling the chamber 18 of the casing 12 with epoxy, the relays 22 become completely embedded in a solid block of epoxy which contributes to significantly dampen the propagation of the sound emitted from the relays 22.

During operation, the relays 22 generate ionized air due to arc formation between the movable contact 36*a* and the stationary contact 36*b*. This phenomenon is known to reduce the service life of the relays 22. The present invention overcomes this problem while still providing for sound insulation of the relays 22 by providing a vent for discharging the ionized air outside of the casing 12.

Figure 2B:
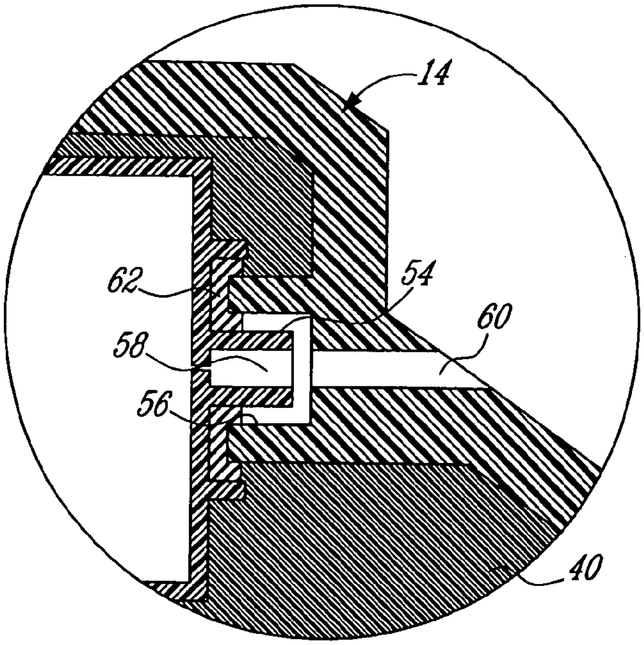
FIG. 2*b* is an enlarged cross-sectional view illustrating how the ionized air produced by the electric relays is vented outside of the thermostat power unit casing.

More specifically, as best shown in FIG. 2*b*, the casing 38 of the relays 22 are preferably provided with a nipple 54 received in a corresponding recess 56 defined in the bottom surface of the base member 14. The nipple 54 is provided with a small composite hole or vent 58 through which ionized air is expelled. The ionized air is vented to the outside through a passage 60 extending from the bottom of the recess 56 in the rear surface of the base member 14. The nipple 54 and the corresponding recess 56 guarantee proper axial alignment of the passage 60 with the vent 58. A washer 62 or silicon is provided about the nipple 54 to prevent plugging of the passage 60 and the vent 58 during the filling operation of the chamber 18.

The filling of the chamber 18 with an epoxy potting compound is also advantageous in that it provides for a more uniform distribution of the temperature within the casing 12. Also, it provides for a more sturdy power unit construction. The electric components embedded in the epoxy are also protected against humidity. Furthermore, the epoxy acts as an electric insulator.

The present invention provides an economic way of acoustically insulating an electric relay while still preventing premature wear of the relay due to ionized air and that without having to incur the costly expense of hermetically sealing the relay in a high-vacuum or pressurized insulating gas environment.

The present invention could be applied to various products or systems incorporating an electromechanical switch which generates audible clicks. For instance it could be incorporated into a baseboard relay of an electric heating system. The epoxy could be poured directly into the casing of the baseboard relay in order to surround the relay operative components on all sides thereof.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims

The invention claimed is:

1. A room thermostat comprising a circuit board, at least one electric relay mounted to the circuit board, a primary casing defining a chamber for housing the circuit board with said at least one electric relay mounted thereon, wherein said chamber is filled with a sound insulating material to dampen the noise generated by said at least one electric relay, said at least one electric relay comprises switch components housed in a secondary casing received within said primary casing, said secondary casing being embedded in said sound insulation material, said primary casing and said secondary casing defining first and second vents, said first and second vents being in fluid flow communication for venting ionized air produced by the at least one electric relay outside of the primary casing.

2. A room thermostat as defined in claim 1, wherein said sound insulating material is a potting compound.

3. A room thermostat as defined in claim 2, wherein said potting compound is selected from a group consisting of: epoxy and urethane compounds.

4. A room thermostat as defined in claim 1, wherein said electric relay is substantially surrounded on all sides by said sound insulation material.

5. A room thermostat as defined in claim 1, wherein one of said first vent and said second vent extends axially through a male projection received in a corresponding female part from which extends another one of said first vent and said second event, said male projection and said female part cooperating to ensure proper axial alignment of said first vent and said second vent.

6. A room thermostat as defined in claim 5, wherein a gasket is provided about said male projection to prevent said insulation material from plugging said first vent and said second vent.

7. A room thermostat as defined in claim 5, wherein said male projection extends from said secondary casing of said electric relay, and wherein said female part is defined in an inner surface of said primary casing.

8. A room thermostat as defined in claim 1, wherein at least one opening is defined in said primary casing for allowing said insulation material to be poured into said chamber after the primary casing has been closed.

9. An acoustically insulated electric unit comprising at least one electromechanical switch, a casing housing said electromechanical switch, said casing being filled with a sound insulation material such that said electromechanical switch be substantially completely embedded in said sound insulation material, said electromechanical switch comprises an electromagnet and an armature housed in a secondary casing received within said casing, said secondary casing being embedded in said sound insulation material, and wherein a vent is defined through the secondary casing and said casing.

10. An acoustically insulated electric unit as defined in claim 9, wherein said sound insulating material is a potting compound.

11. An acoustically insulated electric unit as defined in claim 10, wherein said potting compound is selected from a group consisting of: epoxy and urethane compounds.

12. An acoustically insulated electric unit as defined in claim 9, wherein said vent includes a first outlet passage extending through a nipple projecting outwardly from said secondary casing, said nipple being received in a corresponding recess defined in an inner surface of said casing, and wherein said vent includes a second outlet passage extending from said recess for allowing the ionized air to be vented outside of the casing, the first and second outlet passages being connected in fluid flow communication.

13. An acoustically insulated electric unit as defined in claim 12, wherein a seal is provided about said nipple to prevent said sound insulation material from plugging said vent and said outlet passage.

14. An acoustically insulated electric unit as defined in claim 9, wherein at least one opening is defined in said casing for allowing said sound insulation material to be poured therein.

15. An acoustically insulated electric unit as defined in claim 9, wherein said electric unit is a baseboard relay.

16. A method for acoustically damping the click sound produced by an electromechanical switch comprising an electromagnet and an armature, the method comprising the steps of: disposing the electromagnet and the armature in a switch casing, mounting the switch casing in a main casing with a vent defined in the switch casing in fluid flow communication with an outlet defined in the main casing, and filling a space between the switch casing and the main casing with a sound insulating potting compound.

* * * * *